(12) United States Patent
Oki et al.

(10) Patent No.: US 10,042,236 B2
(45) Date of Patent: Aug. 7, 2018

(54) IMAGING DEVICE (71) Applicant: Panasonic Intellectual Property Management Co., Ltd., Osaka (JP)

(72) Inventors: Akihiro Oki, Osaka (JP); Ryousuke Tamaki, Osaka (JP); Takahiro Ikemizo, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1 day.

(21) Appl. No.: 15/584,789

(22) Filed: May 2, 2017

(65) Prior Publication Data
US 2018/0067383 A1 Mar. 8, 2018

(30) Foreign Application Priority Data

Sep. 7, 2016 (JP) .................................. 2016-174223
Mar. 3, 2017 (JP) .................................. 2017-039981

(51) Int. Cl.
| | |
|---|---|
| *G03B 17/08* | (2006.01) |
| *G03B 19/02* | (2006.01) |
| *G03B 15/04* | (2006.01) |
| *H04N 5/225* | (2006.01) |

(52) U.S. Cl.
CPC ......... *G03B 19/02* (2013.01); *G03B 15/0405* (2013.01); *G03B 17/08* (2013.01); *H04N 5/2251* (2013.01); *H04N 5/2252* (2013.01)

(58) Field of Classification Search
USPC ............................................. 396/25, 28, 29
See application file for complete search history.

(56) References Cited

U.S. PATENT DOCUMENTS

| | | | | |
|---|---|---|---|---|
| 6,002,884 A * | 12/1999 | Okumura | ............... | G03B 17/08 396/25 |
| 6,574,434 B2 * | 6/2003 | Matsuoto | ............... | G03B 17/08 348/81 |
| 7,082,264 B2 * | 7/2006 | Watanabe | ............... | G03B 15/05 396/177 |

FOREIGN PATENT DOCUMENTS

| | | |
|---|---|---|
| JP | 62-226186 A | 10/1987 |
| JP | 2002-202555 A | 7/2002 |
| JP | 2006-308818 A | 11/2006 |
| JP | 2008-203487 A | 9/2008 |
| JP | 2015-041835 A | 3/2015 |

* cited by examiner

*Primary Examiner* — Clayton E LaBalle
*Assistant Examiner* — Warren K Fenwick
(74) *Attorney, Agent, or Firm* — Renner Otto Boisselle & Sklar, LLP (57) ABSTRACT

A digital camera (an imaging device) includes: a camera body (an imaging device body); a flash light emitter having a stored state in which the flash light emitter is stored in the camera body and a projected state in which the flash light emitter projects from the camera body; and a packing (an elastic deformation member). The digital camera has a drip-proof specification in which the packing is pressed and deformed between the flash light emitter and the camera body in the stored state, thereby drip-proof sealing a clearance between the camera body and the flash light emitter.

9 Claims, 12 Drawing Sheets

IMAGING DEVICE

BACKGROUND

1. Technical Field

The present disclosure relates to an imaging device of a drip-proof specification where a clearance between an imaging device body and a flash light emitter is drip-proof sealed.

2. Description of the Related Art

Unexamined Japanese Patent Publication No. 2006-308818 discloses a single-lens reflex camera provided with a pop-up type flash mechanism for a camera. A snap mechanism of this single-lens reflex camera is a simple mechanism with a snap spring and oscillation levers, and is incorporated in a flash light emitter. A camera body and the flash light emitter are coupled only by hinge shafts that turnably support the flash light emitter and the camera body. With this configuration, holes that cause light leakage can be eliminated, and dust-proof and drip-proof effects can be obtained by managing only fitting accuracy of the hinge shafts.

SUMMARY

An imaging device according to the present disclosure includes: an imaging device body; a flash light emitter having a stored state in which the flash light emitter is stored in the imaging device body and a projected state in which the flash light emitter projects from the imaging device body; and an elastic deformation member.

The imaging device has a drip-proof specification in which the elastic deformation member is pressed and deformed between the flash light emitter and the imaging device body in the stored state, thereby drip-proof sealing a clearance between the imaging device body and the flash light emitter.

The imaging device according to the present disclosure is effective for drip-proof sealing the clearance between the imaging device body and the flash light emitter.

DETAILED DESCRIPTION

Hereinafter, exemplary embodiments are described in detail while appropriately referring to the drawings. However, unnecessarily detailed description may be omitted. For example, detailed description of a matter that has been already known well or overlapping description of substantially the same configuration may be omitted. This is to avoid unnecessary redundancy of the following description and to be easily understood by those skilled in the art.

Note that applicants provide the attached drawings and the following description for those skilled in the art to fully understand the present disclosure, and do not intend to limit a subject matter described in the claims.

First Exemplary Embodiment

Hereinafter, a first exemplary embodiment is described with reference to FIGS. 1 to 11.

1-1. CONFIGURATION OF CAMERA

Figure 1:
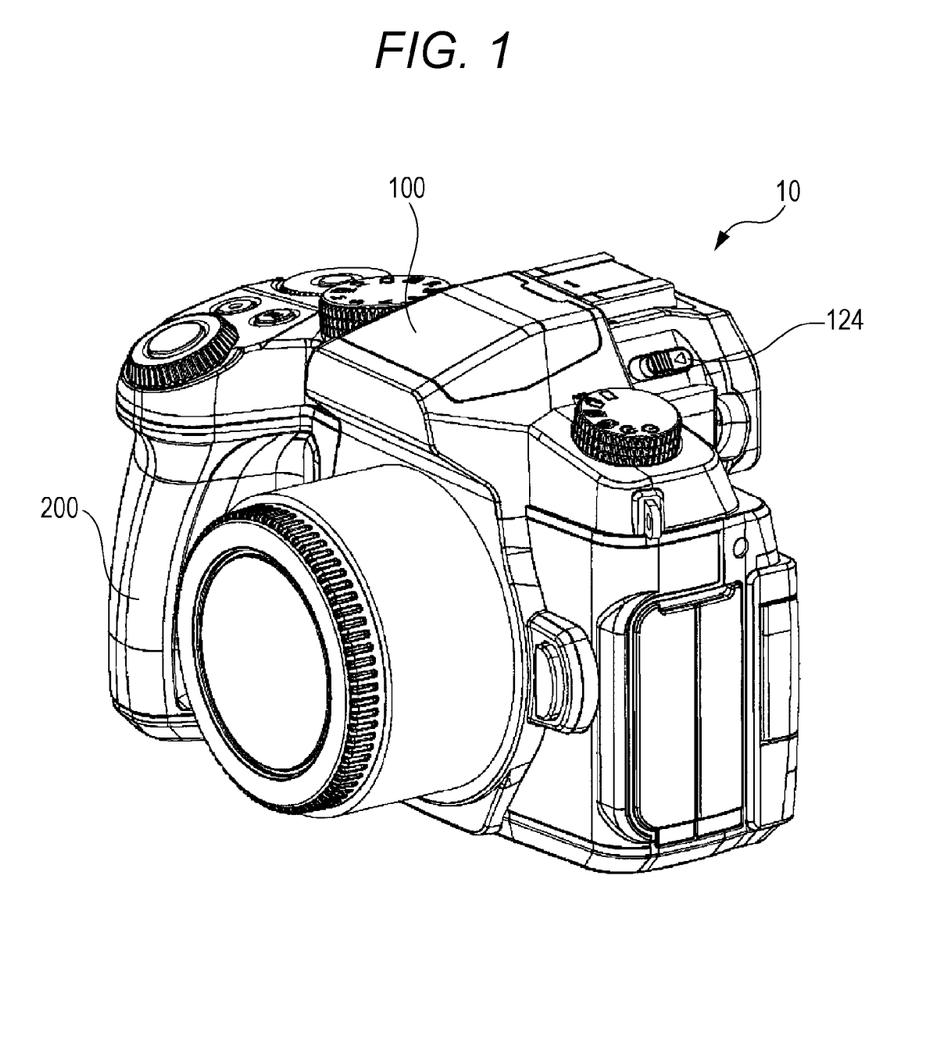
FIG. 1 is an external perspective view of a camera in a state in which a flash light emitter of a digital camera according to a first exemplary embodiment is stored.
Figure 2:
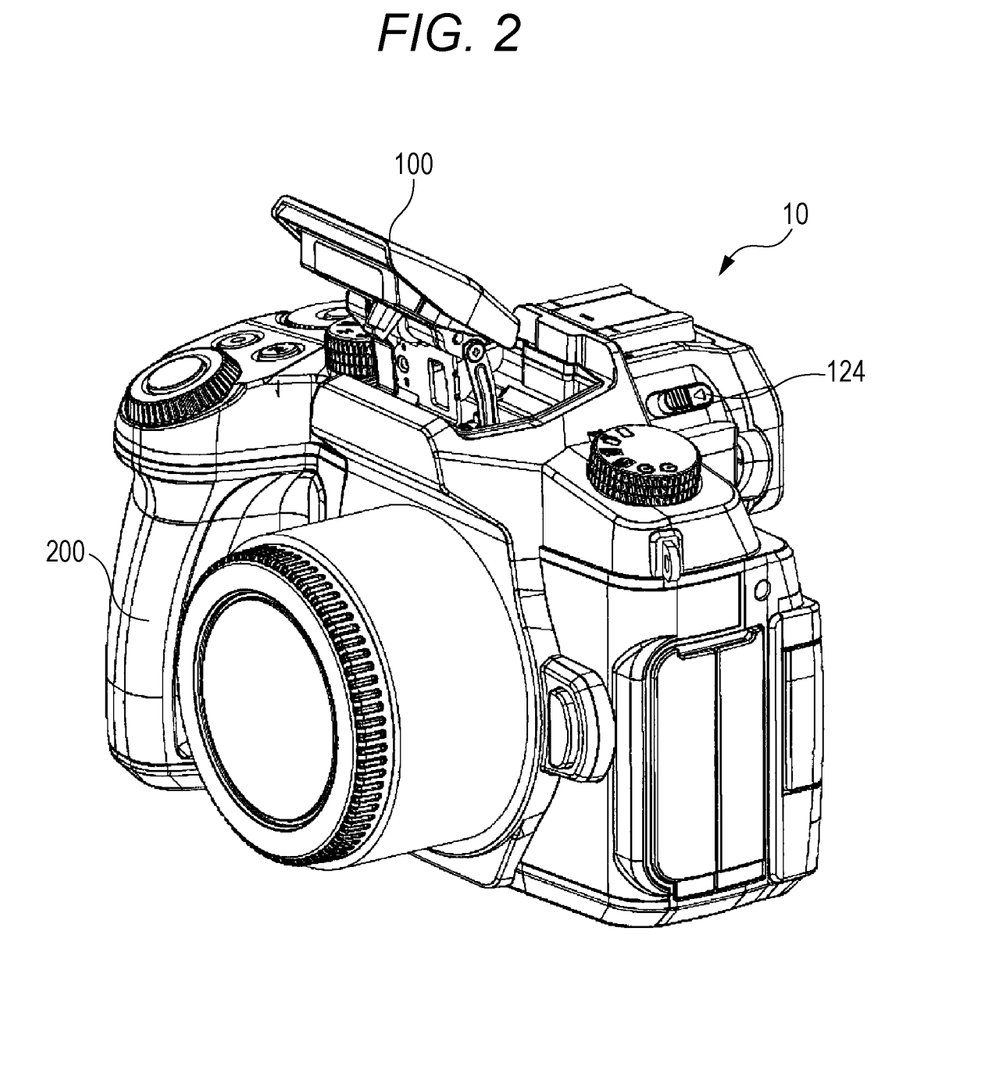
FIG. 2 is an external perspective view of the camera in a state in which the flash light emitter of the digital camera according to the first exemplary embodiment is projected to a position capable of emitting light.

FIG. 1 is an external perspective view of a camera in a state in which a flash light emitter of a digital camera according to the first exemplary embodiment is stored. FIG. 2 is an external perspective view of the camera in a state in which the flash light emitter of the digital camera according to the first exemplary embodiment is projected to a position capable of emitting light. Hereinafter, for convenience of explanation, an upper side of a plane in FIG. 1 serves as an upper side of the digital camera, and a lower side of the plane serves as a lower side of the digital camera. Further, a subject side serves as a front side of the digital camera, and an image surface side serves as a rear side of the digital camera.

Digital camera 10 in the present exemplary embodiment is provided with flash light emitter 100 and camera body 200. The digital camera at least includes an optical system that includes a plurality of lenses, an imaging element, and a memory. Flash light emitter 100 is a so-called incorporated flash. Flash light emitter 100 has a stored state and a projected state. The stored state is a state in which flash light emitter 100 is stored inside camera body 200. The projected state is a state in which flash light emitter 100 is located at a position projecting from camera body 200 more than a position at which flash light emitter 100 is stored, that is, a popped-up state.

FIG. 1 shows the stored state in which flash light emitter 100 is stored in camera body 200. FIG. 2 shows the projected state in which flash light emitter 100 projects from camera body 200.

An outline of a configuration of flash light emitter 100 is described with reference to FIGS. 5, 6, and 8. Flash light emitter 100 is provided with base 118 and locking lever 119 shown in FIG. 6 and with link 114, light emitter case A 110, light emitter case B 111, light emitting unit 102, Fresnel lens 103, circuit board 104, and packing 101 shown in FIG. 8. Flash light emitter 100 further includes spring A 121, spring B 122, shaft A 115, and shaft B 116 shown in FIG. 5 and components, such as screws 112, shown in FIG. 8.

Base 118 is a component for coupling flash light emitter 100 with camera body 200. Locking lever 119 is a component for switching flash light emitter 100 between the stored state and the projected state. Link 114 is a component that couples base 118 and light emitter case B 111. Light emitter case A 110 and light emitter case B 111 are components that store light emitting unit 102, Fresnel lens 103, and circuit board 104. Light emitter case A 110 is a component that constitutes an outer surface of digital camera 10 when flash light emitter 100 is stored.

1-2. POP-UP OPERATION AND STORING OPERATION OF FLASH LIGHT EMITTER

Flash light emitter 100 serving as the incorporated flash in the present exemplary embodiment is a type in which a user manually pops up flash light emitter 100 when in use and the user manually stores flash light emitter 100 when not in use. When the user manually slides operation knob 124 shown in FIG. 1 forward, flash light emitter 100 projects upward. Contrarily, when the user manually pushes down projected flash light emitter 100 shown in FIG. 2, flash light emitter 100 moves to the storage position and is stored. The stored state is kept until operation knob 124 is slid next.

Figure 3:
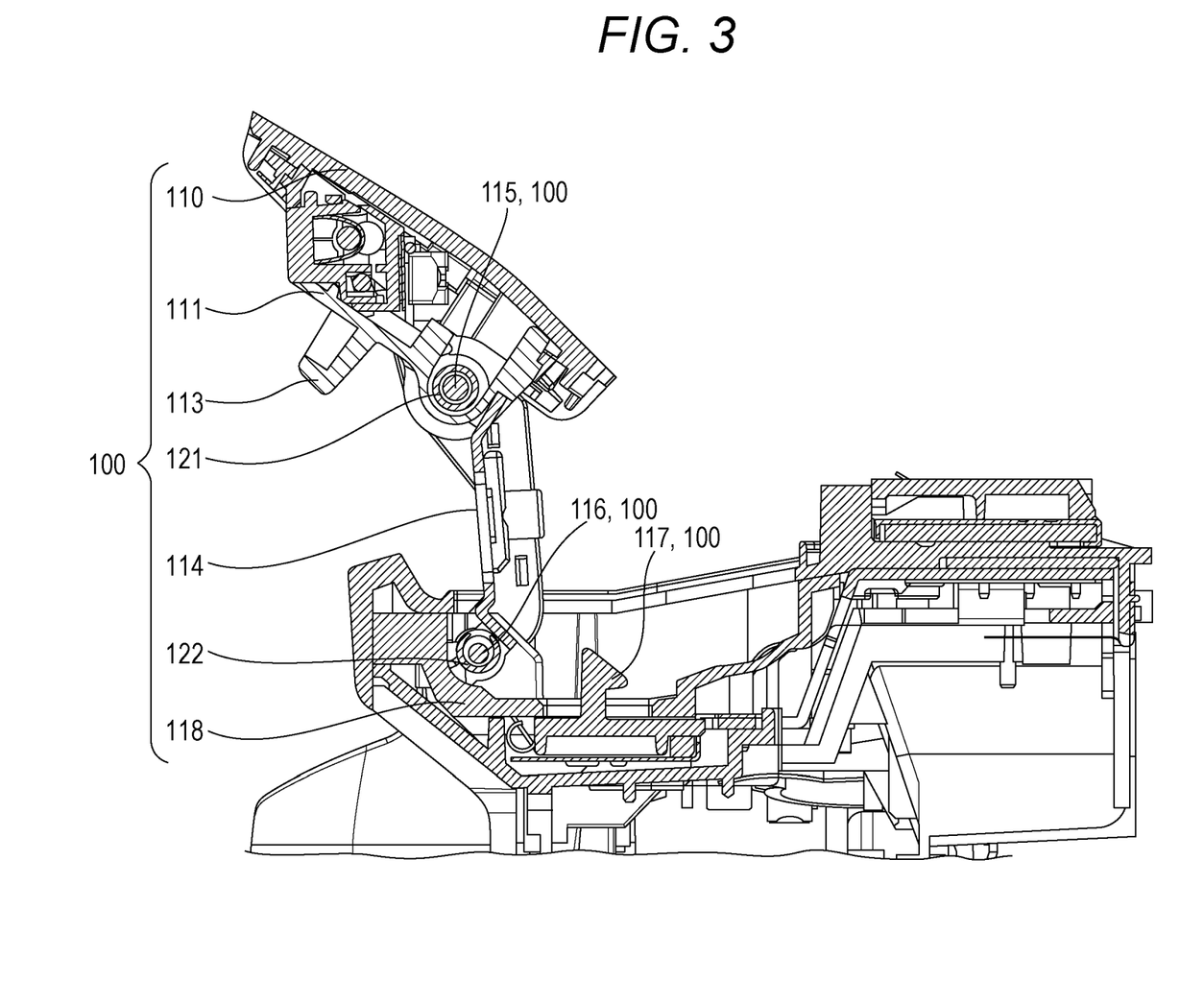
FIG. 3 is a sectional view for explaining a mechanism of pop-up operation of the flash light emitter.
Figure 4:
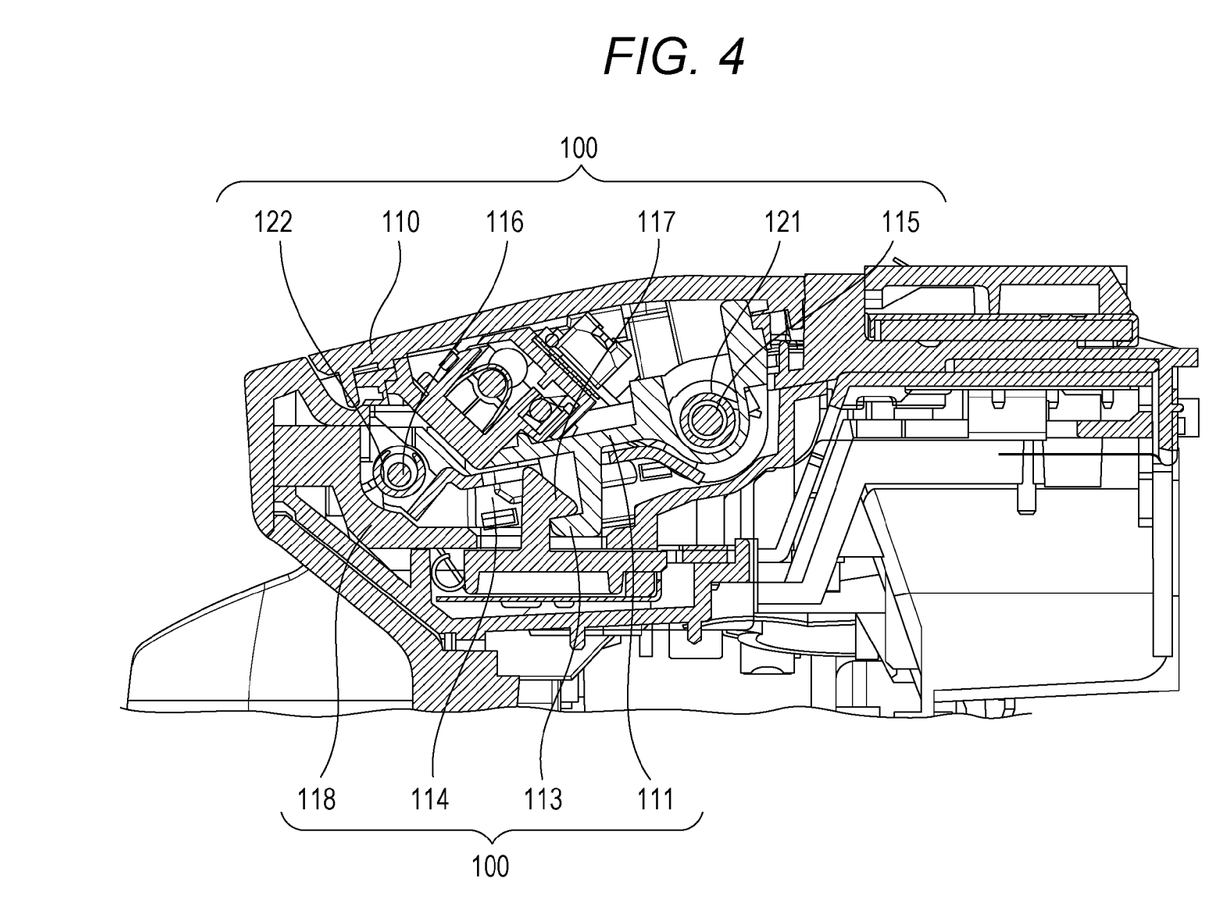
FIG. 4 is a sectional view for explaining a mechanism of storing operation of the flash light emitter.

FIGS. 3 and 4 are sectional views that explain mechanisms of pop-up operation and storing operation of the above-described flash light emitter. FIG. 3 shows the projected state of the flash light emitter, and FIG. 4 shows the stored state of the flash light emitter.

Figure 5:
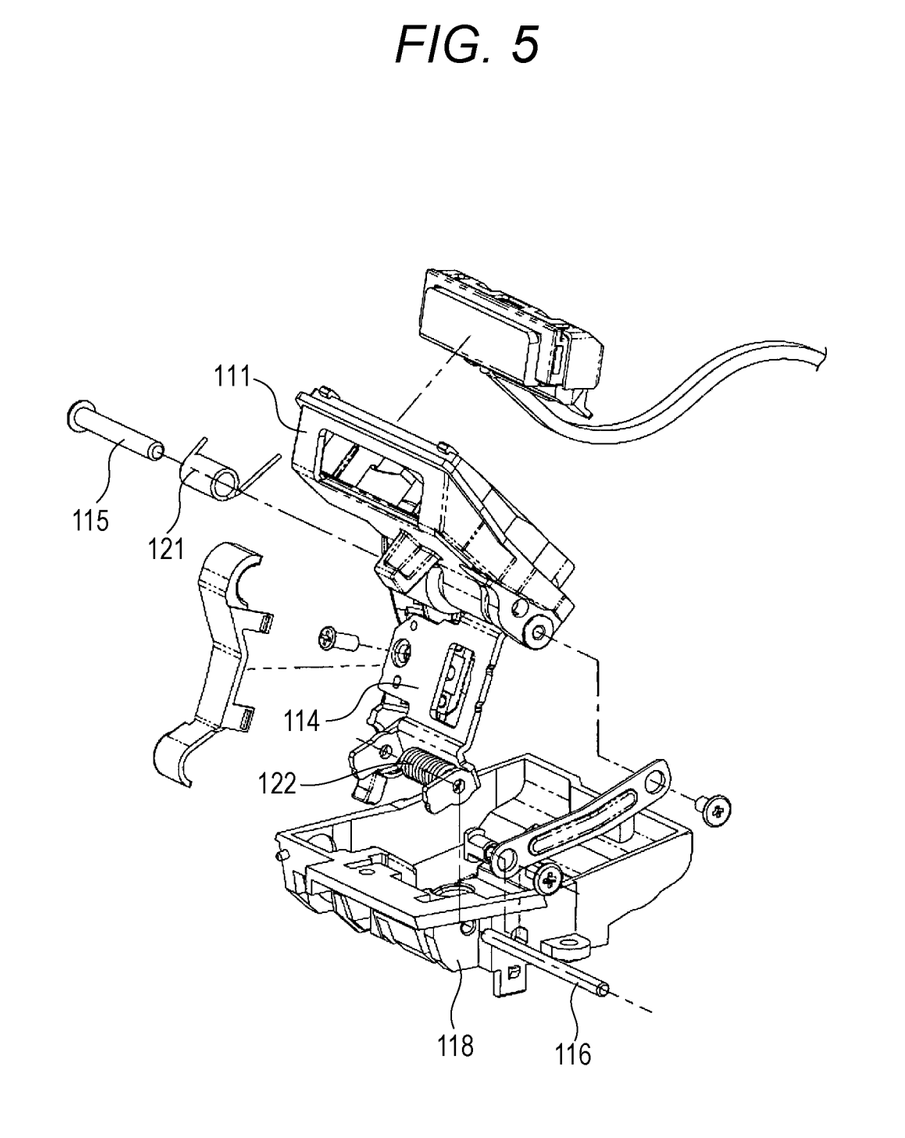
FIG. 5 is an exploded perspective view showing a structure that includes a link for the pop-up operation and springs serving as power sources of the link.
Figure 6:
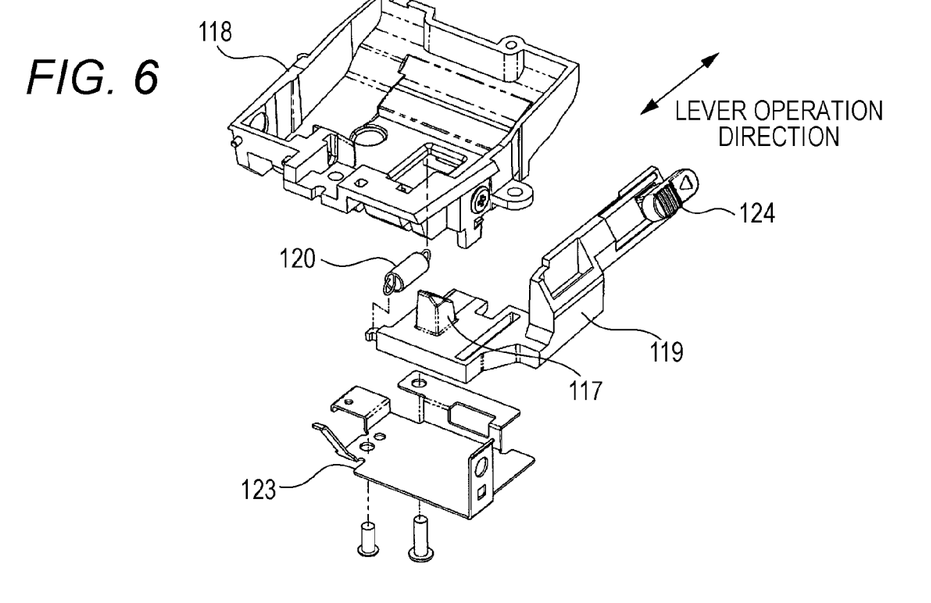
FIG. 6 is an exploded perspective view showing a structure of a locking lever that holds and unlocks the flash light emitter.

FIGS. 5 and 6 are exploded perspective views that explain the mechanisms of pop-up operation and storing operation of the above-described flash light emitter. FIG. 5 shows a structure that includes a link for the pop-up operation and springs serving as power sources of the link. FIG. 6 shows a structure of a locking lever that holds and unlocks the flash light emitter.

In FIGS. 3 and 4, link 114 is rotatably supported to base 118 by shaft B 116. Spring B 122 is installed between base 118 and link 114, and applies torque that rotates link 114 counterclockwise to base 118. Light emitter case B 111 is rotatably supported to link 114 by shaft A 115. Spring A 121 is installed between link 114 and light emitter case B 111, and applies torque that rotates light emitter case B 111 clockwise to link 114.

In FIG. 4, light emitter case B 111 has fixing pawl 113. Fixing pawl 113 of light emitter case B 111 engages with locking pawl 117, which will be described below, provided in locking lever 119. This engagement resists the rotation torque of aforementioned spring A 121 and spring B 122, thereby holding flash light emitter 100 in the stored state.

The pop-up operation of flash light emitter 100 is described below. Locking pawl 117 is moved in a front direction of digital camera 10 by operation of operation knob 124, which will be described below, provided in locking lever 119. Then, fixing pawl 113 and locking pawl 117 are disengaged. When fixing pawl 113 and locking pawl 117 are disengaged, link 114 is rotated counterclockwise by the torque of spring B 122. Then, light emitter case B 111 is rotated clockwise by the torque of spring A 121 simultaneously with the rotation of link 114. Link 114 and light emitter case B 111 are rotated until link 114 and light emitter case B 111 respectively abut on stoppers. Link 114 and light emitter case B 111 are stopped at positions shown in FIG. 3 and are in the projected state. The pop-up operation of flash light emitter 100 is performed according to the above-described operation.

The operation of operation knob 124 and locking pawl 117 is described below. In FIG. 6, operation knob 124 is fixed to engage with locking lever 119. Locking lever 119 is held between base 118 and locking lever plate 123 so as to be linearly movable in a lever operation direction shown in FIG. 6. Locking lever spring 120 is a compression coil spring and installed between locking lever 119 and base 118. Locking lever spring 120 biases locking lever 119 in a rear direction of digital camera 10. When operation force is input to operation knob 124, locking lever 119 moves forward against force of locking lever spring 120. At this time, locking pawl 117 integrally provided with locking lever 119 also moves forward. Locking pawl 117 and fixing pawl 113 shown in FIG. 4 are disengaged by this movement, and the aforementioned pop-up operation is generated.

1-3. MOUNTING CONFIGURATION OF PACKING

Figure 7:
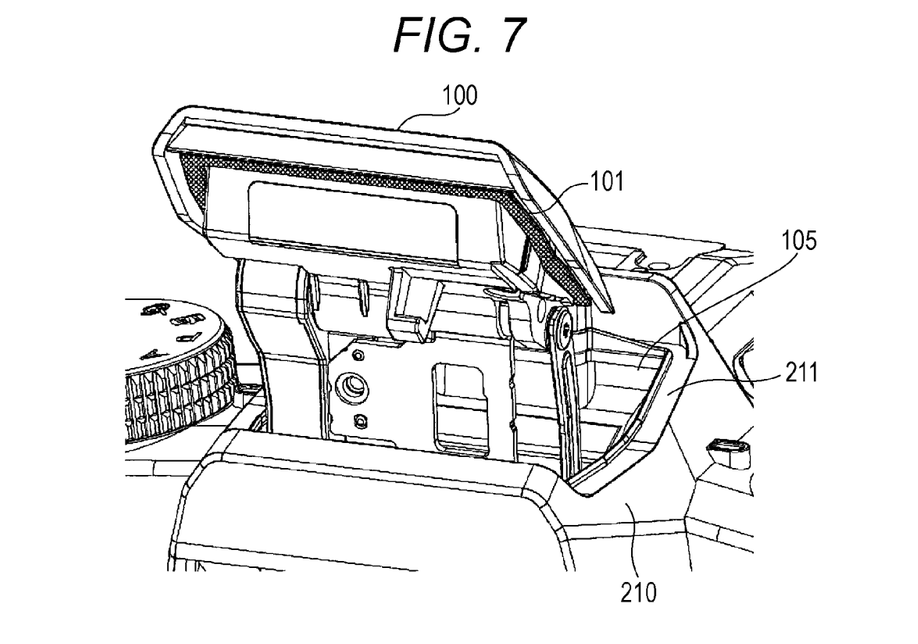
FIG. 7 is an external perspective view showing a shape of the flash light emitter and a camera body around the flash light emitter in the projected state of the flash light emitter.

FIG. 7 shows a shape of the flash light emitter and the camera body around the flash light emitter in the projected state of the flash light emitter.

As shown in FIG. 7, packing 101 is mounted to a periphery of a light emitting panel, which will be described below, of flash light emitter 100 so as to surround the light emitting panel. Packing 101 is one example of an elastic deformation member. Specifically, a material of packing 101 is silicone rubber, and packing 101 can be elastically deformed comparatively greatly. Packing 101 has an annular shape. Recess 105 opened in an upper direction of digital camera 10 is formed on top of body case 210 on a camera body side. Flash light emitter 100 is stored in recess 105. In body case 210, rib 211 is formed over an entire periphery of an opening of recess 105. Rib 211 in the present exemplary embodiment is a projection that projects upward.

Next, a mounting state of the packing is described with reference to FIG. 8. FIG. 8 is an exploded perspective view of the flash light emitter. The light emitting panel includes Fresnel lens 103, light emitting unit 102, circuit board 104, packing 101, light emitter case A 110, screws 112, and light emitter case B 111.

Figure 8:
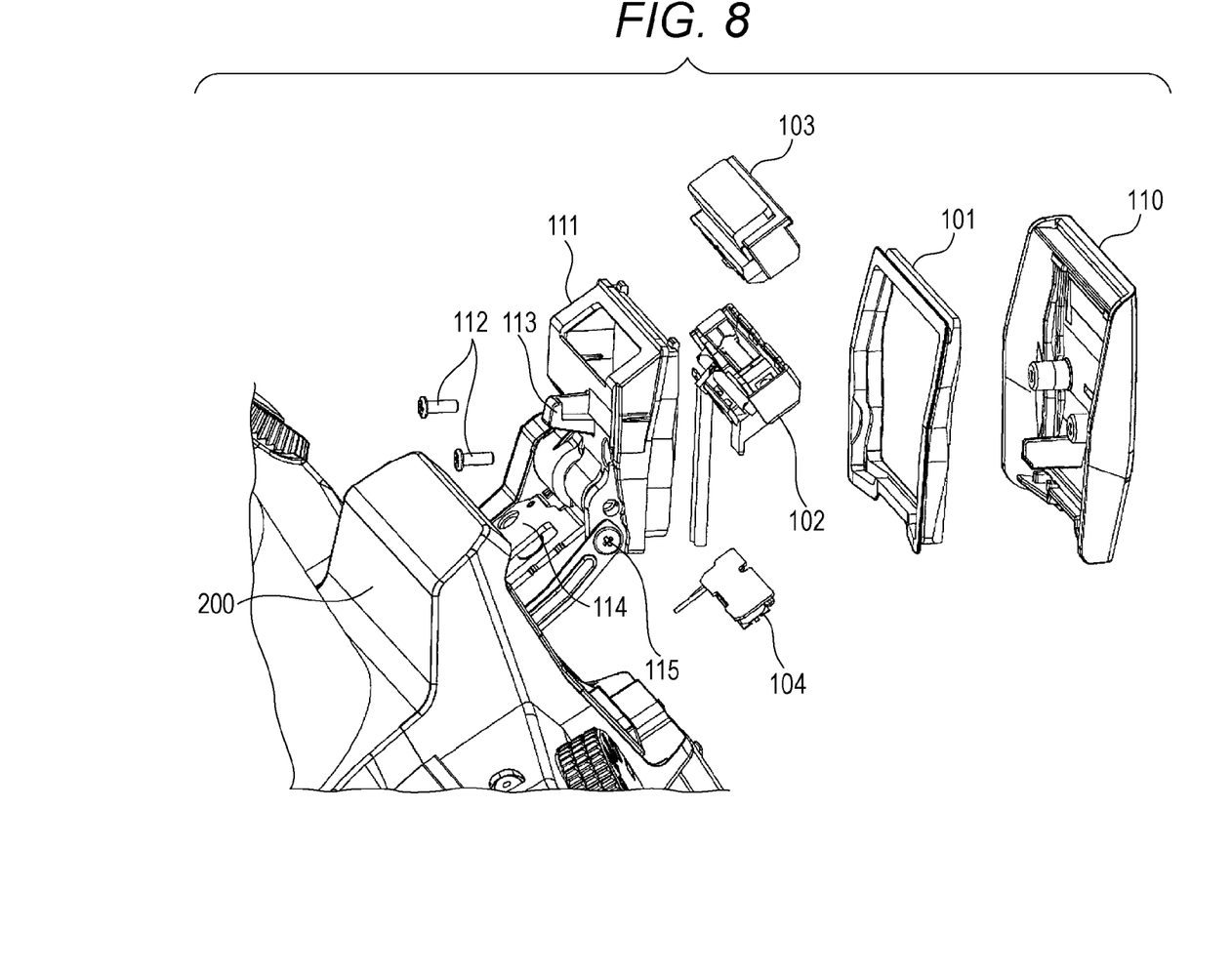
FIG. 8 is an exploded perspective view of the flash light emitter.

As shown in FIG. 8, light emitter case B 111 holds Fresnel lens 103, light emitting unit 102, circuit board 104, and packing 101 while positioning these components. Light emitter case A 110 is fastened with light emitter case B 111 by two screws 112. Fresnel lens 103, light emitting unit 102, and circuit board 104 are housed in a space surrounded by light emitter case A 110 and light emitter case B 111. Further, packing 101 is sandwiched and fixed between light emitter case A 110 and light emitter case B 111.

In case of removing packing 101, a user removes light emitter case A 110 by removing two screws 112, and then removes packing 101 from light emitter case B 111.

Figure 9:
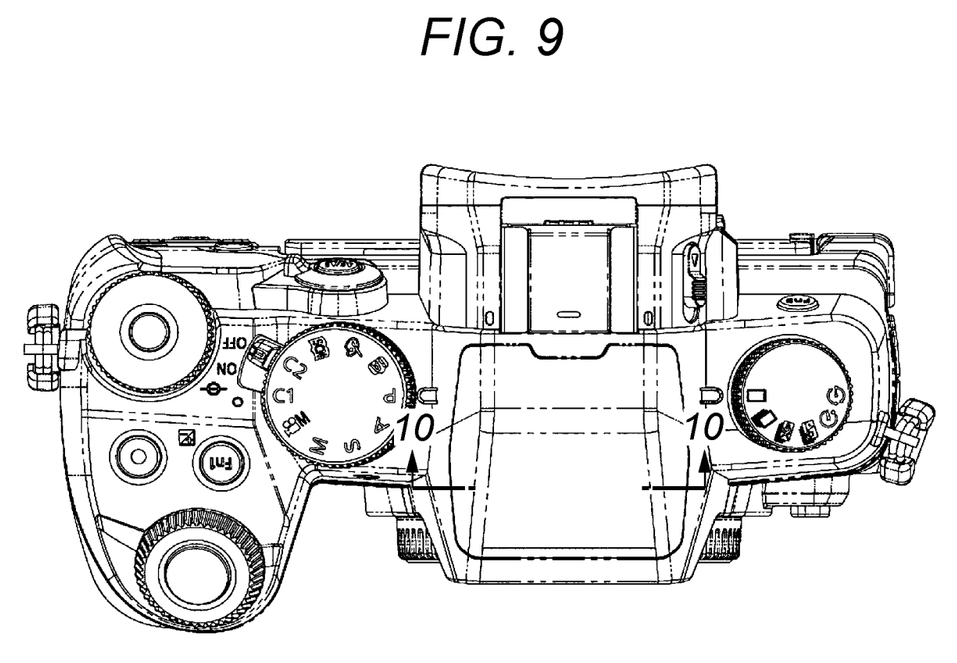
FIG. 9 is a top view of the digital camera showing a sectional position in FIG. 10.
Figure 10:
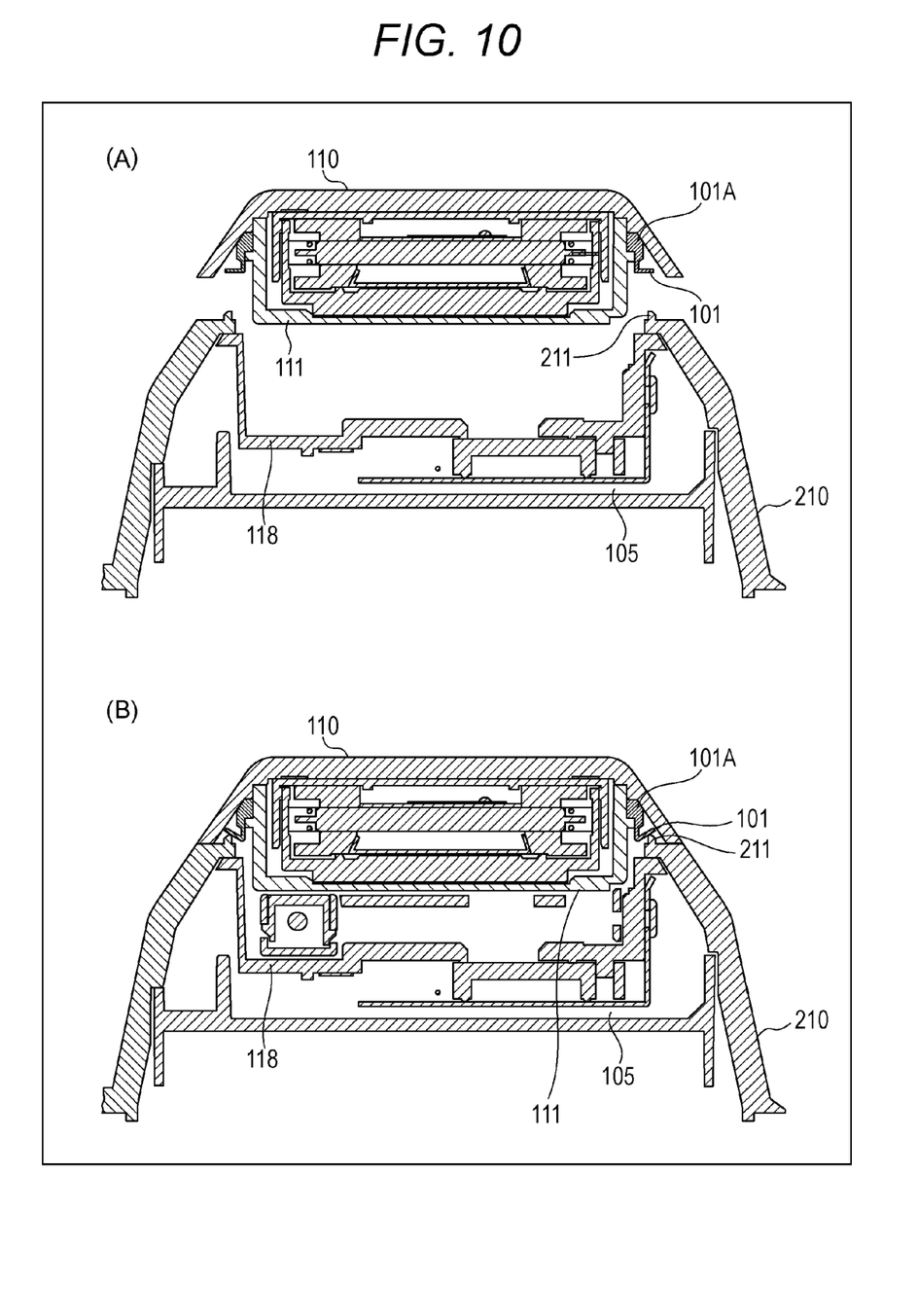
FIG. 10 is a sectional view showing deformation of a packing caused by a contact with a rib.

FIG. 10 is a sectional view showing deformation of the packing caused by a contact with the rib at a position of a cross section taken along a line 10-10 shown in FIG. 9 in an up and down direction (a direction vertical to a plane in FIG. 9). Part (A) of FIG. 10 shows a state before rib 211 and packing 101 make contact with each other. Part (B) of 10 shows a state in which rib 211 and packing 101 are in contact with each other. In other words, part (B) of FIG. 10 shows the stored state of flash light emitter 100.

In a noncontact state in which rib 211 and packing 101 are not in contact with each other, a cross section (a cross section on a surface parallel to the up and down direction of digital camera 10) of packing 101 has a substantially L shape that constitutes a side in a longitudinal direction and a side in a lateral direction, as shown in part (A) of FIG. 10. An upper end of the side in the longitudinal direction serves as packing base 101A. The side in the lateral direction extends outward from a lower end of the side in the longitudinal direction. In a contact state in which packing 101 and rib 211 are in contact with each other, the cross section of packing 101 has a deformed shape so that the side in the lateral direction jumps up, as shown in part (B) of FIG. 10. In this way, packing 101 is pressed and deformed between flash light emitter 100 and camera body 200 in the stored state of flash light emitter 100, thereby drip-proof sealing a clearance between camera body 200 and flash light emitter 100. The drip-proof sealing is to make a sealed state so as to suppress infiltration of water. Digital camera 10 has a drip-proof specification due to this drip-proof sealing.

In other words, packing 101 and rib 211 are closely attached over the entire periphery by repulsive force of packing 101 corresponding to the deformation of packing 101. Infiltration of water into camera body 200 from outside of digital camera 10 (path A in FIG. 11) is prevented.

Further, packing base 101A is sandwiched between both light emitter case A 110 and light emitter case B 111 over the entire periphery, and is in contact with the both. A part of this packing base 101A that makes contact with light emitter case A 110 and light emitter case B 111 prevents infiltration of water into flash light emitter 100 from the outside of digital camera 10 (path B in FIG. 11).

Figure 11:
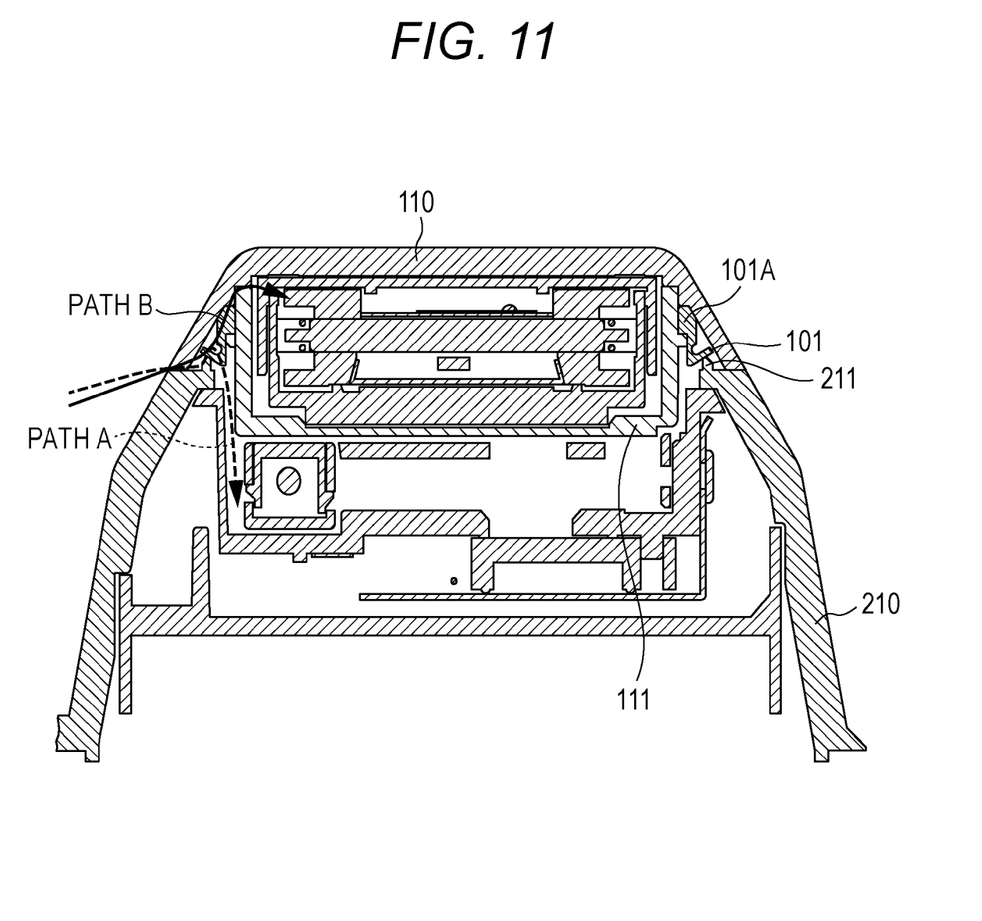
FIG. 11 is a schematic view showing a condition in which both a path from an outside to an inside of the flash light emitter and a path from the outside to an inside of an imaging device body are drip-proof sealed.

As described above, both path B from the outside of digital camera 10 to the inside of flash light emitter 100 and path A from the outside of digital camera 10 to the inside of camera body 200 are drip-proof sealed. Accordingly, digital camera 10 in the present exemplary embodiment has the drip-proof specification.

Variation of First Exemplary Embodiment

Figure 12:
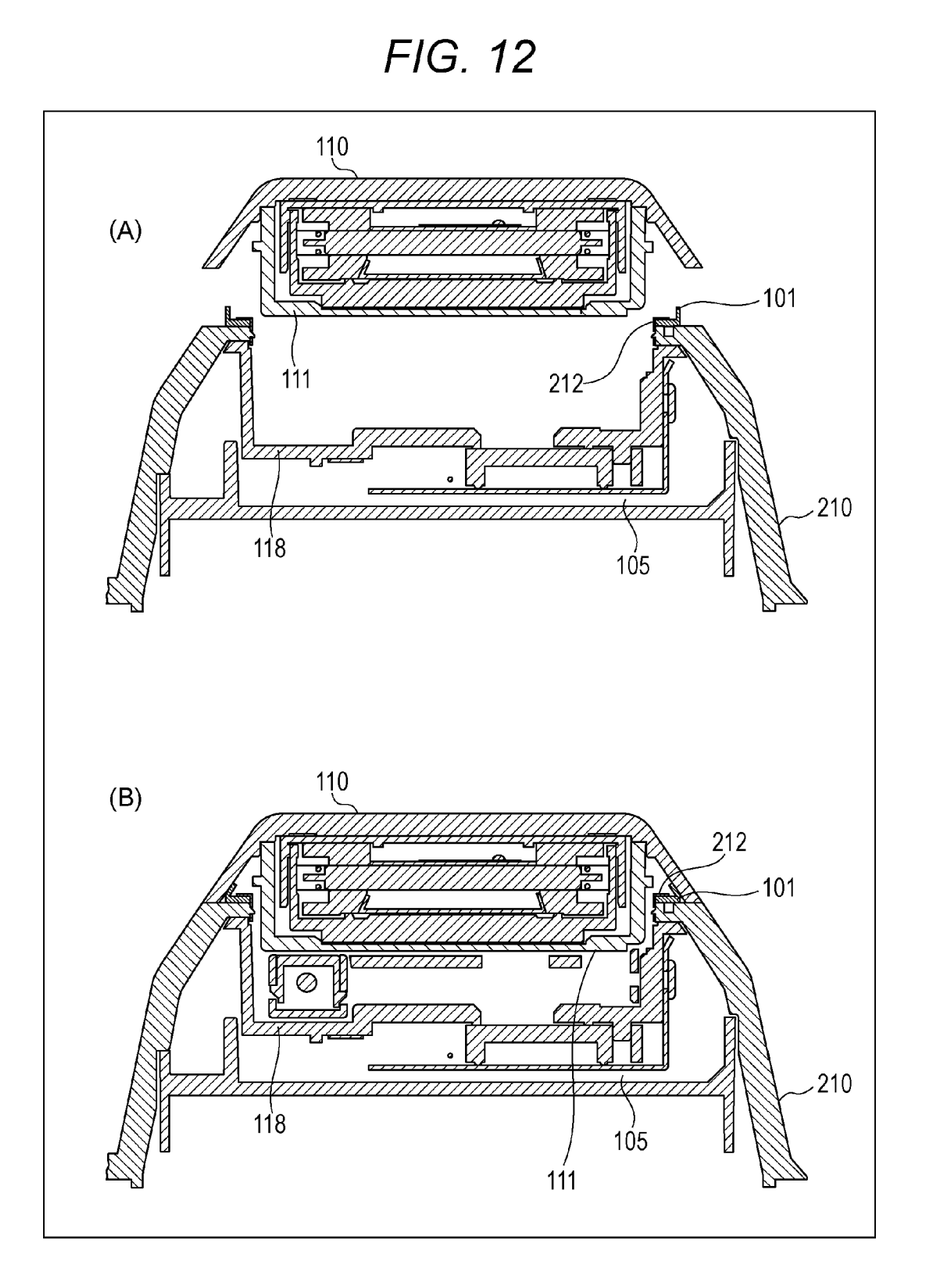
FIG. 12 is a sectional view showing deformation of a packing caused by a contact with a rib according to a variation of the first exemplary embodiment.
Figure 13:
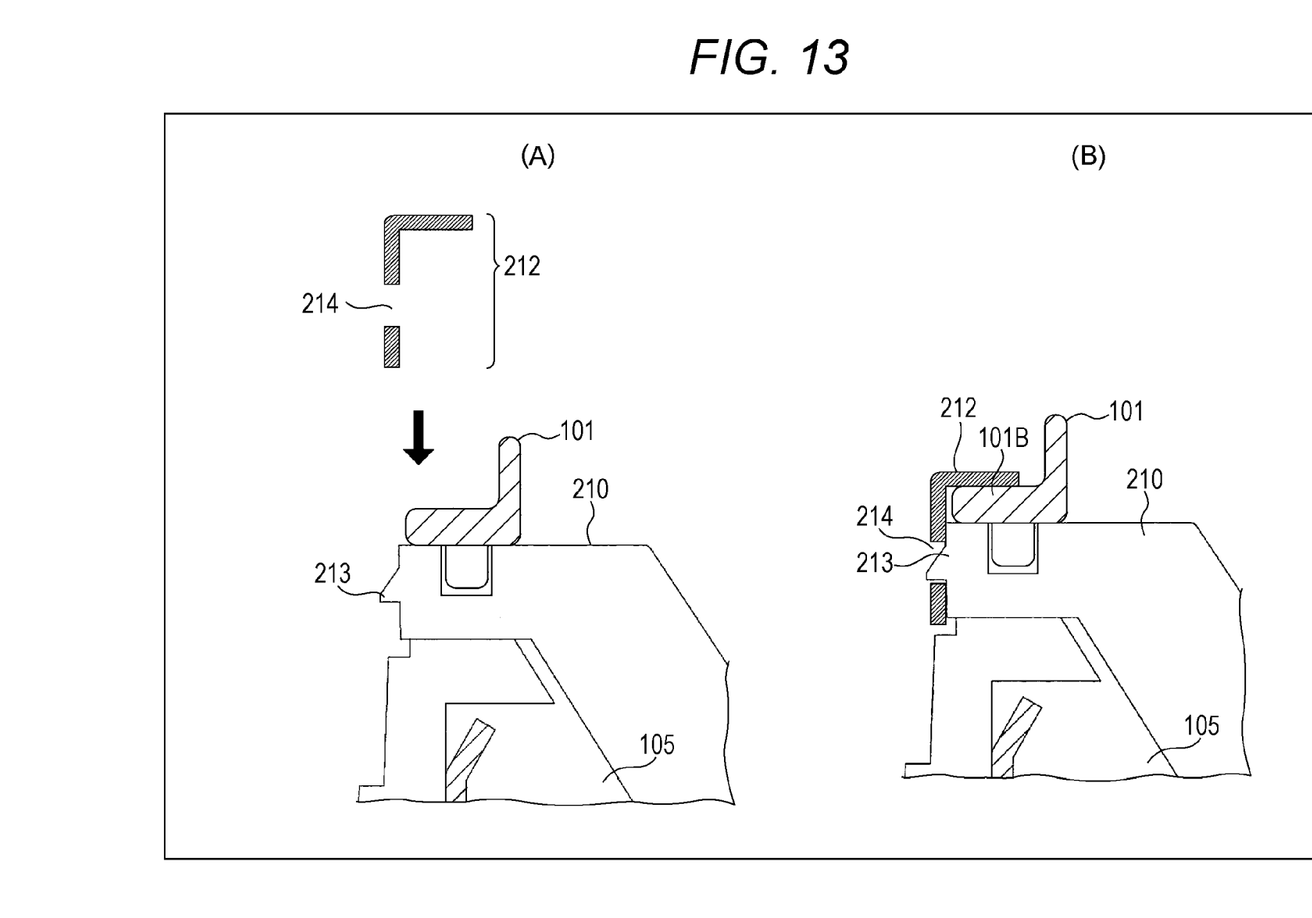
FIG. 13 is a structural view showing a mounting configuration of the packing in the variation of the first exemplary embodiment.

FIG. 12 is a sectional view showing a variation of the first exemplary embodiment. A position of a cross section in FIG. 12 is the same as the position of the cross section taken along the line 10-10 shown in FIG. 9. FIG. 13 is a sectional view showing a mounting configuration of the packing.

In the variation, packing 101 is not mounted to flash light emitter 100 as described in the above first exemplary embodiment, but is mounted to camera body 200 side as shown in FIG. 12. As shown in FIG. 12, fixing plate 212 is a mounting member that can be removed without separating and dismantling flash light emitter 100 from camera body 200. Fixing plate 212 has an annular shape similar to a shape of the opening of recess 105 included in body case 210. A cross section of fixing plate 212 in a surface parallel to an up and down direction of digital camera 10 has a substantially L shape. As shown in FIG. 12, a side in a longitudinal direction of fixing plate 212 faces an inner side surface near the opening of recess 105. A side in a lateral direction of fixing plate 212 is disposed on an outer periphery above the opening of recess 105. Moreover, as shown in FIG. 13, the side in the longitudinal direction of fixing plate 212 has hole 214. Hole 214 is disposed at an exposure position when flash light emitter 100 is in a projected state. Further, projection 213 with a triangular cross section is formed on the inner side surface near the opening of recess 105. Projection 213 with the triangular cross section projects toward an inside of recess 105. Projection 213 with the triangular cross section of body case 210 engages with hole 214 of fixing plate 212, thereby mounting fixing plate 212 to body case 210. Packing 101 has an annular shape. Packing base 101B serving as a part of packing 101 is sandwiched between fixing plate 212 and body case 210, thereby fixing packing 101 to body case 210.

In a noncontact state in which light emitter case A 110 and packing 101 are not in contact with each other, a cross section of packing 101 has a substantially L shape as shown in part (A) of FIG. 12 and part (A) of FIG. 13. A side in a lateral direction of packing 101 constitutes packing base 101B shown in part (B) of FIG. 13. A side in a longitudinal direction of packing 101 is bent upward from an outer end of packing base 101B. In a contact state in which light emitter case A 110 and packing 101 are in contact with each other, that is, a stored state, the side in the longitudinal direction of packing 101 makes contact with an inner surface of light emitter case A 110. The side in the longitudinal direction of packing 101 is bent inward and deformed as shown in part (B) of FIG. 12 by the contact between packing 101 and the inner surface of light emitter case A 110. Packing 101 and the inner surface of light emitter case A 110 are closely attached over an entire periphery by repulsive force of packing 101 due to this deformation, thereby preventing infiltration of water from outside. In case of removing packing 101, a user disengages hole 214 of fixing plate 212 and projection 213 with the triangular cross section of body case 210. Accordingly, the user removes fixing plate 212, and removes packing 101 from body case 210.

1-4. CONCLUSION

As described above, in the first exemplary embodiment, digital camera (imaging device) 10 includes camera body (imaging device body) 200, flash light emitter 100 having a stored state in which flash light emitter 100 is stored in camera body 200 and a projected state in which flash light emitter 100 projects from camera body 200, and packing (elastic deformation member) 101. Digital camera (imaging device) 10 has a drip-proof specification in which packing 101 is pressed and deformed between flash light emitter 100 and camera body 200 in the stored state, thereby drip-proof sealing a clearance between camera body 200 and flash light emitter 100. With this configuration, digital camera (imaging device) 10 is effective for drip-proof sealing the clearance between camera body 200 and flash light emitter 100.

Further, in the first exemplary embodiment, packing 101 is mounted inside flash light emitter 100 so as to be sandwiched between light emitter case A 110 and light emitter case B 111 fixed by two screws 112.

With this configuration, a user can replace packing 101 only by a simple work of removing two screws 112 and removing light emitter case A 110, without dismantling and separating flash light emitter 100 from camera body 200. Accordingly, a workload for replacing packing 101 is significantly reduced. Note that light emitter case A 110 is a component that constitutes an outer surface of digital camera 10. Therefore, the replacement workload is further reduced.

Further, packing base 101A of packing 101 is in contact with both light emitter case A 110 and light emitter case B 111 over an entire periphery by being sandwiched between the two. With this configuration, a path from an outside of camera body 200 to an inside of flash light emitter 100 (path B in FIG. 11) is drip-proof sealed more accurately.

Further, packing 101 is closely attached to rib 211 over the entire periphery in the stored state. With this configuration, a path from the outside of camera body 200 to an inside of camera body 200 (path A in FIG. 11) is drip-proof sealed more accurately.

Further, in the variation of the first exemplary embodiment, packing 101 is mounted to camera body 200 side by being sandwiched between camera body 200 and fixing plate 212 fixed to engage with body case 210 of camera body 200.

With this configuration, the user can replace packing 101 only by a simple work of removing fixing plate 212 by disengaging fixing plate 212 from body case 210, without dismantling and separating flash light emitter 100 from camera body 200. Accordingly, a workload for replacing packing 101 is significantly reduced.

Further, in the variation of the first exemplary embodiment, when flash light emitter 100 is in the projected state, at least hole 214 of fixing plate 212 is exposed. In other words, the user can visually recognize and touch hole 214 by a tool or the like in the projected state. This facilitates the work of removing fixing plate 212.

Other Exemplary Embodiments

As described above, the first exemplary embodiment and its variation are described as implementation examples of the present disclosure. However, the present disclosure is not limited to the first exemplary embodiment and its variation, and is applicable to any exemplary embodiment appropriately changed, replaced, added, or omitted.

The incorporated flash in the present exemplary embodiment is the type in which the incorporated flash is manually popped up when in use and is manually stored when not in use. However, the incorporated flash may be a type in which the flash is automatically popped up according to a quantity of light of a subject during photography and is automatically stored at an end of the photography.

Further, it is described that the material of packing 101 is silicone rubber. However, packing 101 may be formed of other materials. For example, packing 101 may be formed of an elastically deforming material, such as a sheet material of thermoplastic elastomer, sponge, PET (polyester terephthalate), or the like.

As described above, the applicants provide the exemplary embodiment and the other exemplary embodiments that are considered to be the best mode through the attached drawings and the detailed description. These exemplary embodiments are provided for those skilled in the art to illustrate the subject matter described in the claims by referring to the specific exemplary embodiment. Therefore, the components described in the attached drawings and the detailed description can include not only essential components to solve the problem but also the other components. Accordingly, these non-essential components should not be immediately recognized as essential components just because these non-essential components are described in the attached drawings or the detailed description. Further, various changes, replacements, additions, or omissions can be made to the aforementioned exemplary embodiments within the scope of claims or their equivalents.

The present disclosure is applicable to an imaging device provided with a flash light emitter. Specifically, the present disclosure is applicable to a digital still camera, a movie camera, a cell phone with a camera function, a smart phone, or the like.

What is claimed is:

1. An imaging device comprising:
an imaging device body;
a flash light emitter having a stored state in which the flash light emitter is stored in the imaging device body and a projected state in which the flash light emitter projects from the imaging device body; and
an elastic deformation member,
wherein
the elastic deformation member is not pressed and deformed between the flash light emitter and the imaging device body in the projected state, and
the imaging device has a drip-proof specification in which the elastic deformation member is pressed and deformed between the flash light emitter and the imaging device body in the stored state, and a clearance between the imaging device body and the flash light emitter is drip-proof sealed.

2. The imaging device according to claim 1, wherein the elastic deformation member is mounted to the flash light emitter.

3. The imaging device according to claim 2, wherein the elastic deformation member is mounted to the flash light emitter by being sandwiched by a plurality of components that constitute the flash light emitter.

4. The imaging device according to claim 3, wherein both a path from an outside of the imaging device body to an inside of the flash light emitter and a path from the outside to an inside of the imaging device body are drip-proof sealed.

5. The imaging device according to claim 4, wherein the elastic deformation member is sandwiched by the plurality of components over an entire periphery.

6. The imaging device according to claim 4, wherein the elastic deformation member is closely attached to the imaging device body over an entire periphery in the stored state.

7. The imaging device according to claim 1, wherein the elastic deformation member is mounted to the imaging device body.

8. The imaging device according to claim 7, wherein the elastic deformation member is mounted to the imaging device body by being sandwiched between the imaging device body and a mounting member being removable without separating and dismantling the flash light emitter from the imaging device body.

9. The imaging device according to claim 8, wherein when the flash light emitter is in the projected state, at least a part of the mounting member is exposed.

* * * * *